United States Patent [19]

Kurose et al.

[11] 3,913,382

[45] Oct. 21, 1975

[54] LEAKAGE TEST APPARATUS FOR TUBULAR BODIES

[75] Inventors: Yukiteru Kurose, Tokyo; Noriroo Shimizudani, Yokohama, both of Japan

[73] Assignee: The Victaulic Co. of Japan, Tokyo, Japan

[22] Filed: Sept. 12, 1973

[21] Appl. No.: 396,408

[30] Foreign Application Priority Data
Sept. 21, 1972  Japan.................... 47-108954[U]

[52] U.S. Cl..................................... 73/46; 73/49.8
[51] Int. Cl.² ........................................ G01M 3/08
[58] Field of Search................... 73/49.8, 46

[56] References Cited
UNITED STATES PATENTS

| 1,788,845 | 1/1931 | Reynolds | 73/46 |
| 1,931,502 | 10/1933 | Markle et al. | 73/46 |
| 2,927,456 | 3/1960 | Russell | 73/46 |
| 3,338,088 | 8/1967 | Smith et al. | 73/46 |

FOREIGN PATENTS OR APPLICATIONS

| 739,158 | 10/1955 | United Kingdom | 73/46 |
| 697,095 | 9/1953 | United Kingdom | 73/46 |
| 706,106 | 3/1954 | United Kingdom | 73/46 |
| 706,348 | 3/1954 | United Kingdom | 73/46 |

Primary Examiner—Richard C. Queisser
Assistant Examiner—Joseph W. Roskos
Attorney, Agent, or Firm—William Anthony Drucker

[57] ABSTRACT

A leakage test apparatus of tubular body comprising a packing to be attached to the interior face of a tubular body to be tested, a pressure plate attached for pressing this packing on the interior face of the tubular body, and supporting members provided with pressing means exerting pressing action, and the presser plate being not only divided into multiple parts radially but also divided at least into two parts circumferentially so that the aforesaid each pressing means may act on each presser plate and may perform leakage test of joint portions even in case the test portion is positioned eccentrically or assembled in misalignment.

4 Claims, 12 Drawing Figures

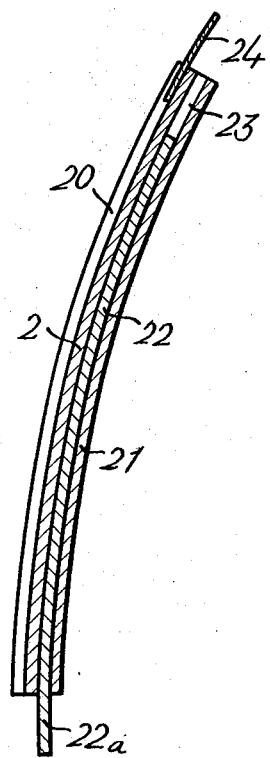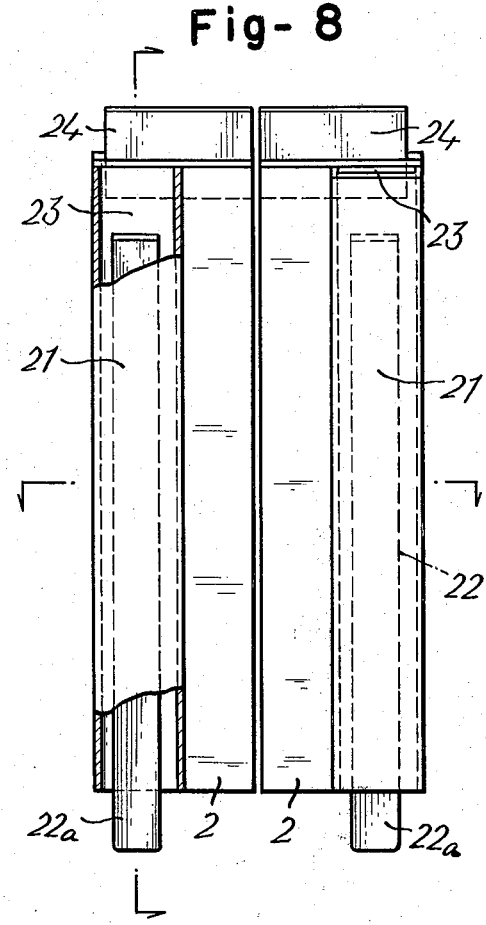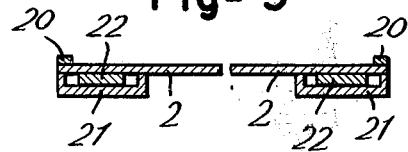

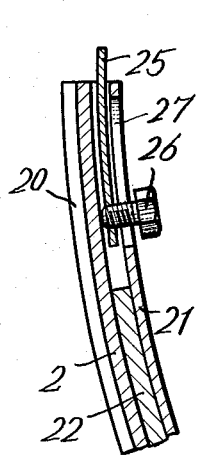
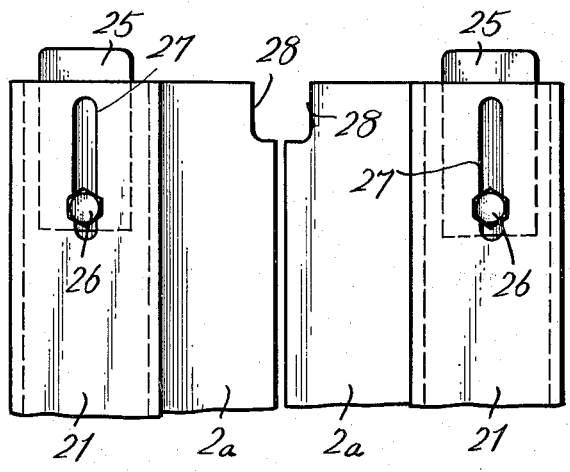
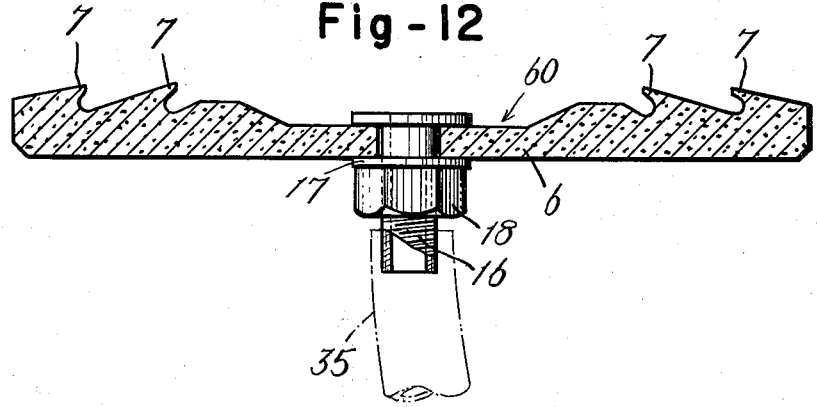

LEAKAGE TEST APPARATUS FOR TUBULAR BODIES

SUMMARY OF THE INVENTION

The present invention relates to a creation of a leakage test apparatus of tubular body and has for its object to obtain an apparatus suitable to testing leakage at joints, defects, and other leakage of tubular body.

It is indispensable for formation of piping to connect tubular bodies mutually by means of joint members or connect directly by means of welding or other similar means, furthermore, to close holes in the defects present in tubular bodies by means of welding, etc. With respect to these joint portions or defective portions, the test must be conducted after the execution of piping work but before the fluid is not passed yet. For such purpose of the testing, there have been hitherto proposed some ideas and methods contemplated to satisfy the conditions. One of such preferred method is to attach a rubber ring inside the tubular body and attach to the rubber ring a plurality of presser plates divided by lines parallel to the tubular axis, further pressing to hold the presser plates by adjust screws of supporting members installed inside the tubular body. However, these conventional methods employ flat presser plates; accordingly, although leakage test may be performed on simple welded joints or defective portions, but in case of testing the sealability of a joint structure portion intended for sealing by a packing internally placed in the joint members merely by mutually opposing ends of two tubular bodies, both tubular bodies often lie eccentrically and in misalignment or bend to cross tubular axis of each other. There are further cases in which tubular bodies different in tube diameter are connected in a temporarily assembled condition; in these cases, the probability of leakage occurrence is really high. Even though there is not found leakage in the standard case of concentric tubes equal in diameter, leakage frequently occurs under those diversified conditions. However, the conventional type of test method cannot be applied successfully to joint portions between tubular bodies assembled under the aforesaid conditions. That is to say, in case of the testing apparatus having a conventional composition applied to the interior faces of such tubular body joint as described above, what is obtained between the end edge of rigid presser plate and the interior surfaces of tubular body or between the end of tubular body and the presser plate, is simply a formation of linear contact portion and a stable contact relationship cannot be obtained. Consequently, even though packing is utilized, a completely sealed condition may not be formed, and, therefore, the object of test is not accomplished.

The present invention is intended for eliminating the defect and inconvenience found in the conventional apparatus as described above, and makes it possible to perform a proper leakage test ensuring sealing relationship even when it is applied to such a step-forming piping joint portion as due to misalignment or different diameter, or an inclinedly formed joint portion because of the situation.

The essential object of the present invention is to provide a leakage test apparatus capable of forming a seal relationship entirely as perfect as in the case of connection of pipings of equal diameter and concentricity even in case piping composing members are connected forming a step as in misalignment or diameter difference or inclinedly. As described before, the conventional leakage test apparatus cannot form a complete seal relationship any longer in case connected tubular bodies are not in alignment or different in diameter forming a step or inclined to a degree. These are cases in which there is a much risk of leakage occurrence, and it is already stated that it substantially cannot accomplish the important aim of the test. The present invention can form an exact sealing condition stable in such situations and perform a really effective leakage test.

Another object of an apparatus according to the present invention is to provide a leakage test apparatus of tubular bodies which can maintain an effective sealing condition under relatively low press force exerted by a pressing means on a packing. As described above, the conventional apparatus needs a considerably high pressure on the packing since there is much risk of leakage as above described. That is formation of the aimed sealing condition requires the deformation of packing by sufficiently pressing. In the present invention, tongue pieces are adopted to eliminate such disadvantage and an attempt is made to form a seal condition on the tubular body by internal pressure against the tongue piece. As a result of thus effecting sealing action in direct proportion to internal pressure by this tongue piece, sufficient seal can be achieved by much less tightening force in comparison with a case in which sealing is obtained by only press force acting on the packing as is the case with the conventional apparatus, this fact also much facilitating the handling and operation of this test.

Other object of an apparatus according to the present invention is to obtain a leakage test apparatus to be disassembled into small parts and transportable to an arbitrary position in the piping and, further, capable of composing a structure as accurate as an integrally formed apparatus when assembled. In the above-mentioned conventional apparatus, too, consideration is given to transportation of the apparatus in disassembled state into the piping in its own way. However, such test apparatus as capable of being disassembled tends to be unstable in the assembled condition. Because of this, it has a disadvantage that the pressed condition by the presser plate pressing packing is not always stable. According to the present invention, such a disadvantage is dissolved. Numerous members, particularly even if divided into a large number of presser plates, when assembled, can form a support and press relationship nearly as stable as an integratedly composed one since each member builds up effective interrelation. By so doing, transportability and accuracy of leakage test are both secured.

All other many features and the function and effect of the apparatus according to the present invention will be apparent from the explanation of the manner of embodiments described below.

BRIEF EXPLANATION OF DRAWINGS

FIG. 7 is a cross-sectional view of a presser plate along the line VII — VII of FIG. 8;

FIG. 8 is a partly cross-sectional side view of the presser plate seen from the inside;

FIG. 9 is a cross-sectional view along the line IX — IX of FIG. 8;

FIG. 10 is a partial inner side view showing the end portion of the part used in the final part when assembling the presser plate;

FIG. 11 is a cross-sectional view along the line XI — XI of FIG. 10; and

FIG. 12 shows a cross section of a packing as well as an inlet mounted for supplying a fluid for testing.

DETAILED DESCRIPTION OF THE INVENTION

Figure 1:
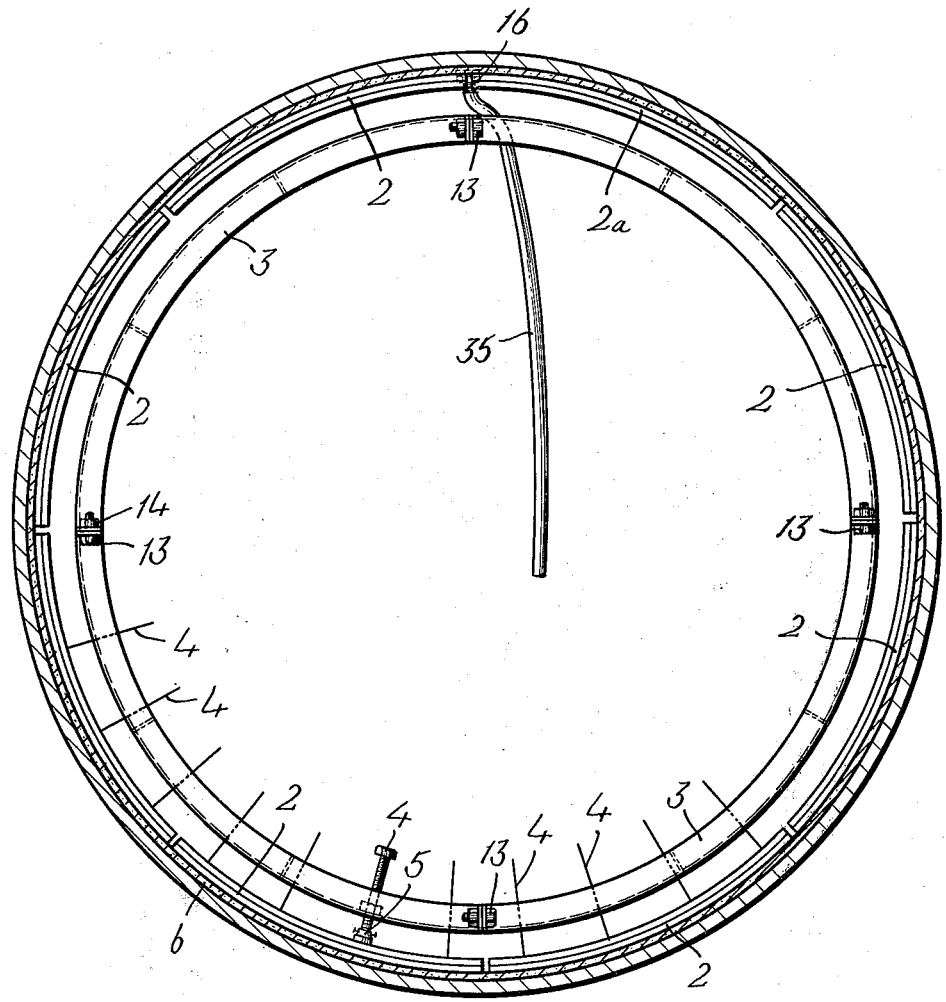
FIG. 1 is a side view of the whole of a leakage test apparatus according to the present invention.
Figure 2:
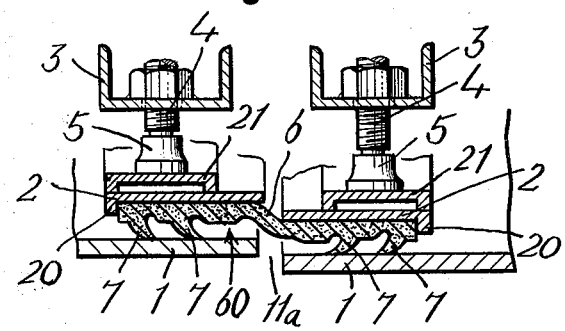
FIG. 2 is a cross-sectional view thereof applied for test between tubular bodies in a step-forming situation.
Figure 3:
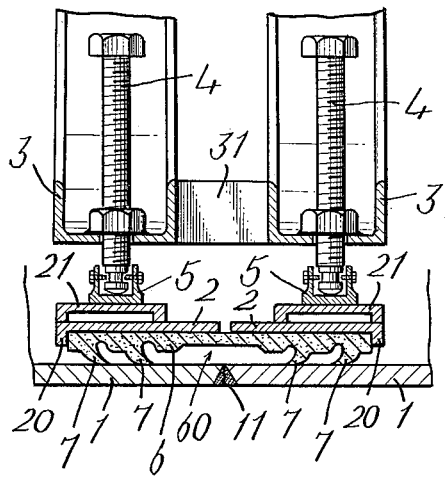
FIG. 3 is a cross-sectional view thereof when applied to a joint of concentric tubes equal in diameter.
Figure 5:
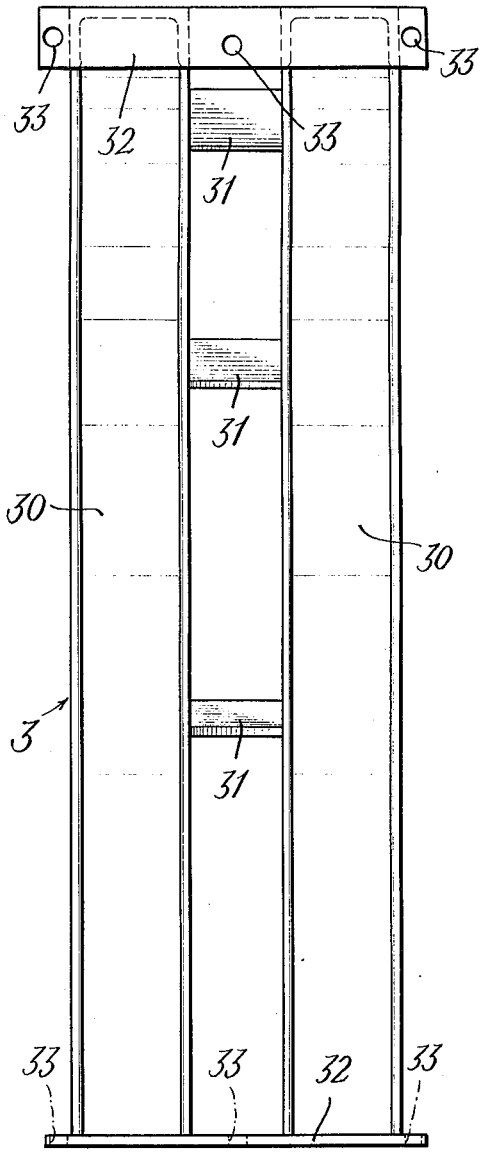
FIG. 5 is a side view of one supporting member seen from the inside.
Figure 4:
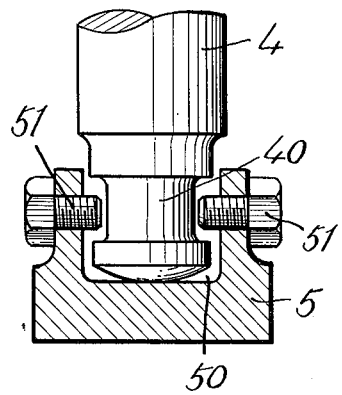
FIG. 4 is an enlarged cross-sectional view showing the structure for mounting a shoe member on a presser.
Figure 6:
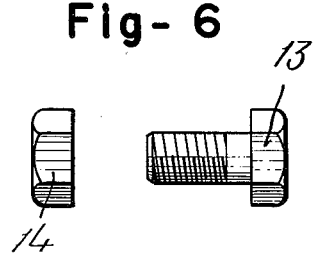
FIG. 6 is a side view of a bolt and nut connecting said supporting member.

To explain the present invention with reference to the accompanying drawings, the overall compositional relation of a test apparatus according to the present invention is as shown in FIG. 1 and, as shown in FIGS. 2 and 3, consists of a packing 6 attached to the interior surface at test positions 11 or 11a of a tubular body 1, a plurality of presser plate 2 arranged along the interior side of the packing 6, and a supporting member 3 provided with a plurality of pressers 4 which exert pressing action on the presser plate 2. An explanation will be given to each component. In the packing 6, as shown in cross sections of FIGS. 2 and 3, an inner cavity or hollow portion 60 enough to accommodate at least the test positions 11 or 11a is formed outside the band-shaped ring body. On both sides of the inner cavity or hollow portion 60, there are oppositely provided tongue pieces 7,7 contacting inclinedly on the interior surface of the tubular body 1, in plural number or preferably two to three pieces. The presser plate 2 is divided not only by lines along the radial direction of the tubular body 1 or packing 6 into a plurality of pieces (eight pieces in the case of FIG. 1) as shown in FIG. 1, but also by lines along the circumferential direction into two pieces as shown in FIGS. 2 and 3. On the outside of each presser plate divided by the lines along the circumferential direction, a bent portion 20 is provided for covering the side edge of the packing 6, thus enclosing the packing as a whole by the presser plates 2,2. On the outside of the presser plate 2 is mounted a box-like seat 21 for taking the pressure of the presser 4 fastened to the supporting plate 3, and a shoe member 5 provided on the end of the presser 4 is arranged to exert pressing action on the box-like seat 21. The shoe member 5 is mounted on the end of the presser 4 as shown in FIG. 4 in detail. Into a hollow portion 50 provided in the upper middle surface is inserted the contracted part 40 of the end of the presser 4 which is rotatably mounted on the shoe member 5 by engaging the ends of cap screws 51,51 with the contracted part 40. The supporting member 3 is smaller in diameter than the diameter of a circle that the disposed presser plates form as a whole and, therefore, positioned inside as shown in FIG. 1. The supporting member 3 is divided into a plurality of portions in the radial direction of the tubular body 1 or packing 6 in the case shown in the drawing. In the manner of this embodiment, the supporting member 3 is divided into 4 parts, and a concrete structure of one part is illustrated in FIG. 5. Each of these divided supporting members 3 is formed by connecting channel members 30,30 of C-shape in cross section in parallel by connecting members 31, and providing end plates 32,32 on the end portion thereof; bolt holes 33 are provided on the end plate 32, and bolts 13 as shown in FIG. 6 are inserted into the bolt holes 33. By tightening the oppositely facing end plates 32 with the aid of nuts 14, an overall annular supporting member is constructed. The bolt holes 33 provided on the end plates 32 are so arranged that the middle hole does not take position in a line with two end holes; by tightening by bolts 13 with such bolt holes 33,33,33 such a stable fastening can be obtained that all the surface of the end plate 32,32 of the supporting plate 3 is closely joined.

The more detailed structure of each of the aforesaid presser plate 2 is illustrated in FIGS. 7 to 9, showing in parallel two plates divided along the circumferential direction. The above-mentioned box-like seat 21 is each provided with an inserted plate 22 in such a manner that one end thereof 22a is projected. Consequently, on the other end side of each box-like seat 21 is provided a receiving portion 23 for receiving one end portion 22a projected in such a manner in case these presser plates are successively connected and disposed. On the back face at the other end of the presser plate 2, there is provided a relatively thin strap 24 in a properly projecting manner as shown in FIG. 8, and this strap 24 is so arranged as to block the gap to be produced between presser plates 2,2 in case presser plates are successively connected and disposed. As will be seen in reference to FIGS. 7 and 8, each presser plate 2,2, . . . is connected double circumferentially at one end portion 22a and a strap 24 when it is assembled. Furthermore, as the wide strap 24 takes its position nearer to the packing 6, a stable connection is obtained and the packing 6 is effectively pressed.

For any one of presser plates 2a positioned at or near the top of presser plates 2 as shown in FIG. 1, one end portion 22a of the inserted plate 22 is formed as shown in FIGS. 10 and 11 replacing the construction shown in FIGS. 7 and 8. The other end of the inserted plate 22 extends to a position shown inside the box-like seat 21 in FIG. 11, and from that portion a long hole 27 is provided in the box-like seat 21 on the end side. An adjust screw 26 for a connecting plate 25 to be inserted into the box-like seat 21 is arranged to be positioned inside the long hole 27. The connecting plate 25 is made to slide along the long hole 27 by adjusting the screw 26, so that the connecting plate 25 enters into or goes out of the end of the box-like seat 21. For instance, assembling presser plates by successively connecting from below as above described, a presser plate 22a is inserted in such a condition that a connecting plate 25 is put into the box-like seat 21, and then the connecting plate 25 is projected out, thereby inserting the projected portion of the connecting plate 25 into the receiving portion 23 of the box-like seat 21 in the presser plate 2 disposed opposite to one side of the presser plate 2a and thus completing the connection.

On the middle part of the end side of such presser plates 2a,2a, there are oppositely provided cut portions 28,28, and a tube 35 for supplying a fluid for testing is introduced through these cut portions 28,28. The supporting members 3 have sufficient spaces between connecting members 31,31 apparent from the structure shown in FIG. 5 and permit the insertion of a pipe 35 for supplying test fluid. The presser plates 2,2 also permit the insertion of said pipe from the cut portions 28,28. The test fluid supply tube inserted in such a way is connected finally in the packing 6 to the inlet member 16 mounted by a nut 18 through a washer 17 so as to communicate with its inner cavity 60 as shown in FIG. 12, thereby making it possible high pressure air or pressure water into a space formed between the packing 6 and the tubular body 1. The airtightness or watertightness at the above-mentioned test position 11 or 11a is thus made possible.

The test position may of course be taken at the welding defect as shown in FIG. 3. However, the apparatus according to the present invention is preferable particularly in the case of joints of tubes joined eccentrically or different in diameter. In FIG. 2, outside the oppositely disposed tubular bodies, 1,1, i.e., on the under side of the drawing an arbitrary tube joint members are disposed and a joint is made between the two tubes 1,1.

As explained above, the present invention is similar to hitherto known apparatuses in that a packing is applied to the interior face of a position to be tested and the test is carried out under such a cindition that the packing is pressed against the tubular body by a presser plate 2 presses and held by a presser provided on the supporting member. However, the presser plate 2 is divided into many parts not only in the radial direction but in the circumferential direction as already explained. Therefore, even is case tubular bosies 1, 1 are misaligned or different in diameter as shown in FIG. 2, a proper and uniform seal condition is obtained between a packing and tubular bodies with nothing more than a slight bending of the packing merely by adjusting the projection of the presser 4 projected from the supporting member 3. Particularly by tounge pieces 7, 7 in multiple sleps, stable seal condition is obtained and rffective test on the presence of leakage can be conducted. The packing forms tounge pieces outside the hollow portion constituting the inner cavity and the pressure of fluid introduced for testing, therefore acts on the tounge piece 7 and a seal performance in direct porportion to the fluid pressure may be expected on the tubular body, and a sufficient seal is obtained by less pressing force.

Furthermore, the apparatus according to this invention is easy and convenient to handle or operate and excellent in accurate test result and other functions, and effective and valuable in industrial use.

We claim:

1. A leakage test apparatus for a tubular body comprising a continuous packing member applied to the interior surface of a tubular body; plural connected supporting members provided concentrically to the interior of said packing member and a series of arcuate pressing members between said packing member and said supporting members; said packing member having axially spaced lips contacting the inerior surface of said tubular body to provide a hollow space therebetween for receiving fluid under pressure; said supporting members being divided radially into multiple parts and connected to each other by means of bolts; said pressing member being positioned over each said lip portion of said packing member in series; each pressing member comprising a shoe, and a pressing means connected to said supporting member; said lips being inclined toward each other and into said hollow portion and having a sharp edge seal against said tubular body interior surface, a connector plate projecting from one end of said pressing members and supported on the concave surface thereof, receiving means at the other end of said pressing members for receiving the projecting portions of the connector plate of an adjacent member to form a complete circle of pressing members and connector plates.

2. A leakage test apparatus according to claim 1, wherein the packing member is provided with a plurality of like lips on each side of the hollow space.

3. A leakage test apparatus according to claim 1, wherein a second plate member is secured to the convex surface of a pressing member and projects from one end thereof to overlie the convex end surface of an adjacent pressing member.

4. A leakage test apparatus according to claim 1, wherein at least one of the pressing members is provided with means for slidably supporting the plate member for slidable movement into the receiving means of an adjacent pressing member, and means for securing said slidable plate member against sliding movements.

* * * * *

UNITED STATES PATENT AND TRADEMARK OFFICE
CERTIFICATE OF CORRECTION

PATENT NO. : 3,913,382
DATED : October 21, 1975
INVENTOR(S) : Kurose et al

It is certified that error appears in the above-identified patent and that said Letters Patent are hereby corrected as shown below:

Column 1, change name of the assignee from "The Victaulic Co. of Japan" to --The Victaulic Co. of Japan Ltd.--

Signed and Sealed this

Fourteenth Day of December 1976

[SEAL]

*Attest:*

RUTH C. MASON
*Attesting Officer*

C. MARSHALL DANN
*Commissioner of Patents and Trademarks*